(12) United States Patent
Zhou

(10) Patent No.: US 11,681,885 B2
(45) Date of Patent: Jun. 20, 2023

(54) CASH COUNTER WITH INFRARED LIGHT SOURCE FOR SCANNING IMAGING

(71) Applicant: Anhui Chenguang Electronic Technology Co., Ltd., Huangshan (CN)

(72) Inventor: Yueli Zhou, Anhui (CN)

(73) Assignee: ANHUI CHENGUANG ELECTRONIC TECHNOLOGY CO., LTD, Huangshan (CN)

( * ) Notice: Subject to any disclaimer, the term of this patent is extended or adjusted under 35 U.S.C. 154(b) by 172 days.

(21) Appl. No.: 17/194,326

(22) Filed: Mar. 8, 2021

(65) Prior Publication Data

US 2022/0284206 A1   Sep. 8, 2022

(51) Int. Cl.
*G06K 7/12*      (2006.01)
*G07D 11/50*   (2019.01)

(52) U.S. Cl.
CPC .............. *G06K 7/12* (2013.01); *G07D 11/50* (2019.01)

(58) Field of Classification Search
CPC ................................ G06K 7/12; G07D 11/50
See application file for complete search history.

(56) References Cited

U.S. PATENT DOCUMENTS

| 2010/0282846 A1* | 11/2010 | Won | G07D 11/16 |
| | | | 235/425 |
| 2011/0004336 A1* | 1/2011 | Numata | G07D 7/04 |
| | | | 700/219 |

FOREIGN PATENT DOCUMENTS

| CN | 1415951 A | * | 5/2003 |
| CN | 204675425 U | * | 9/2015 |
| CN | 205880997 U | * | 1/2017 |
| KR | 101324813 | * | 11/2013 |

* cited by examiner

*Primary Examiner* — Sonji N Johnson
(74) *Attorney, Agent, or Firm* — Andrew C. Cheng

(57) ABSTRACT

A cash counter with an infrared light source for scanning imaging is provided. The cash counter includes a cash counter body, the cash counter body including a cash feeding table, a cash dispensing assembly, an infrared light source emitting assembly, an infrared light source receiving assembly, a motor, a transmission assembly, a display screen for displaying the number of cashes, a cash receiving assembly and a cash receiving rack; the infrared light source emitting assembly and the infrared light source receiving assembly are provided to face each other; the cash receiving assembly receives the identified cashes and transfers the identified cashes to the cash receiving rack; and the motor supplies power for the cash dispensing assembly, the cash receiving assembly and the transmission assembly to rotate, respectively.

7 Claims, 4 Drawing Sheets

CASH COUNTER WITH INFRARED LIGHT SOURCE FOR SCANNING IMAGING

TECHNICAL FIELD

The present invention relates to the field of cash counters, in particular to a cash counter with an infrared light source for scanning imaging.

RELATED ART

A cash counter with a scanning imaging function, as a supporting device for cash counting and imaging operations, is indispensably used in banks, which can facilitate the staff to quickly count cashes, with faster work efficiency and higher accuracy. The use types of cash counters are also more diversified, in order to be convenient for people to use. With the continuous development of science and technology, people have higher and higher requirements for the manufacturing process of a cash counter with a scanning imaging function.

The existing cash counter with a scanning imaging function has certain drawbacks when used. Firstly, the imaging operation cannot be performed well during cash counting. The use structure is relatively simple, which brings inconvenience to people. For this reason, a novel cash counter with an infrared light source for scanning imaging is proposed.

SUMMARY OF THE INVENTION

The technical problem to be solved by the present invention is to provide a novel cash counter with an infrared light source for scanning imaging, which can count one thousand cashes per minute and realize infrared fuzzy imaging to identify the authenticity of the cashes.

To fulfill the objective, the present invention adopts the following technical solution:

a cash counter with an infrared light source for scanning imaging is provided. The cash counter includes a cash counter body, the cash counter body including a cash feeding table, a cash dispensing assembly, an infrared light source emitting assembly, an infrared light source receiving assembly, a motor, a transmission assembly, a display screen for displaying the number of cashes, a cash receiving assembly and a cash receiving rack;

the cash feeding table is provided at an upper end of the cash counter body, and a cash inlet is defined at a lower end of the cash feeding table; the cash dispensing assembly is arranged beside the cash inlet; the cash dispensing assembly is configured such that each cash is rolled into the cash counter body and enters a cash passing channel formed by a plurality of rollers in the transmission assembly;

the infrared light source emitting assembly and the infrared light source receiving assembly are provided to face each other; a channel between the infrared light source emitting assembly and the infrared light source receiving assembly constitutes a part of the cash passing channel; the infrared light source emitting assembly emits infrared light onto each cash; the infrared light source receiving assembly is configured to identify the authenticity of each cash according to the strength of a voltage that the infrared light source emitting assembly penetrates each cash, by processing each cash by means of a logic chip of the infrared light source receiving assembly and then sending to a main control chip for fuzzy imaging; the number of the identified cashes is displayed on the display screen;

the cash receiving assembly receives the identified cashes and transfers the identified cashes to the cash receiving rack; and the motor supplies power for the cash dispensing assembly, the cash receiving assembly and the transmission assembly to rotate, respectively.

Preferably, the cash counter body further includes a plurality of counterfeit identification sensors that assists in identifying each cash.

Preferably, two slidably-adjustable limiting pieces are provided at an upper end of the cash inlet, and different sizes of cashes are placed on the cash feeding table by adjusting the limiting pieces.

Preferably, a cash stopper for blocking cashes and preventing the cashes from scattering is provided outside the cash receiving rack.

Preferably, the cash dispensing assembly includes a cash dispensing roller and a cash pressing roller.

Preferably, the cash counter body further includes a left cover and a right cover, and a handle which assists in carrying the cash counter body with hands is arranged between the left cover and the right cover.

Preferably, a display cover is further arranged at an upper part of the cash counter body, and the display screen is provided on the display cover.

Compared with the prior art, the present invention adopts an infrared induction technology to scan and count cashes, which can count one thousand cashes per minute and realize infrared imaging. The infrared light source emitting assembly is responsible for sensing light. The infrared light source receiving assembly is responsible for scanning sensing, and making adjustments according to different types of cashes. During cash counting, cashes are placed in a cash inlet of the cash feeding table. After the cash counter is powered on, the cashes are automatically rolled into the inside of the cash counter for a cash counting operation. An infrared fuzzy imaging cash-counting operation is performed by the infrared light source receiving assembly, with a faster cash counting speed and higher accuracy, and displayed on the display screen of a display cover, such that the work efficiency is improved. After the counting and authenticity identifying of the cashes are completed, the cashes are conveyed out through the cash receiving assembly. The cashes are received and blocked by the cash receiving rack and a cash stopper to prevent the cashes from falling, which is simple and practical. The whole cash counter is simpler in structure and more convenient to operate, and has a better use effect than traditional methods.

BRIEF DESCRIPTION OF THE DRAWINGS

To illustrate the technical schemes in the embodiments of the present invention more clearly, the required figures described in the embodiments will be introduced briefly. Obviously, the figures described hereunder are just some embodiments of the present invention. For those of ordinary skill in the art, they can also obtain other figures based on these figures without creative work.

DETAILED DESCRIPTION

The technical scheme in the embodiments of the invention will be described clearly and completely as follows in combination with the drawings in the embodiments of the present invention. Apparently, the embodiments described are some embodiments of the present invention, but not all embodiments. Based on the embodiments of the present invention, all other embodiments obtained by those of ordinary skill in the art without creative work fall within the protection scope of the present invention.

Figure 1:
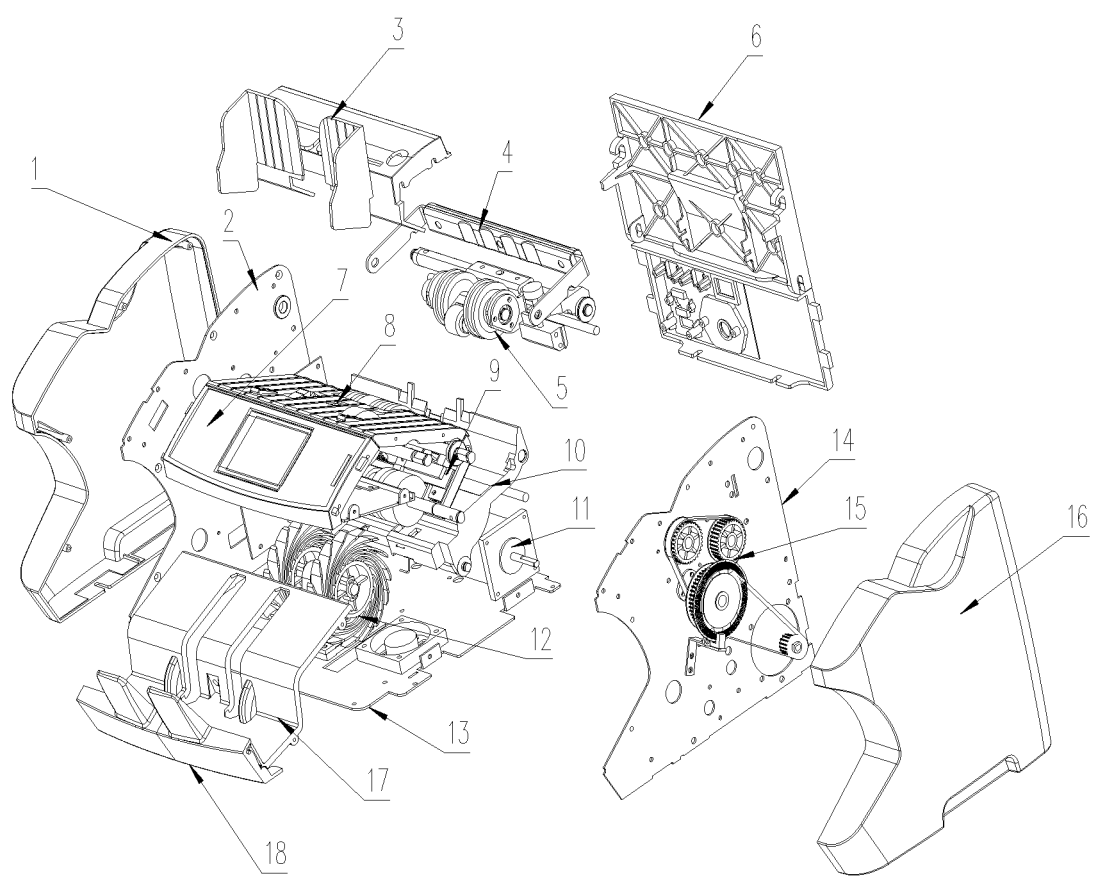
FIG. 1 is an exploded view of a cash counter of the present invention.
Figure 2:
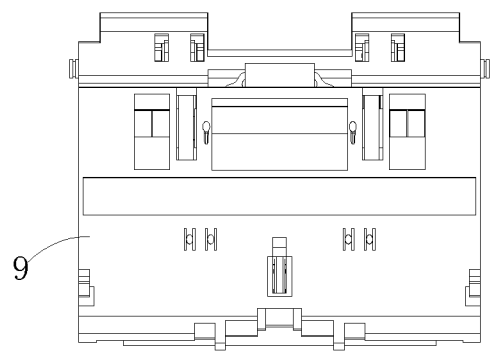
FIG. 2 is a structural schematic diagram of an infrared light source emitting assembly in the cash counter of the present invention.
Figure 3:
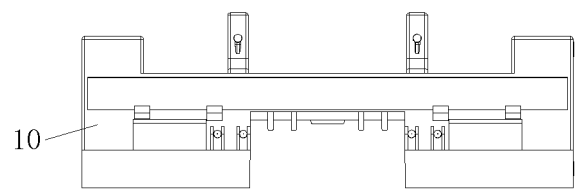
FIG. 3 is a structural schematic diagram of an infrared light source receiving assembly in the cash counter of the present invention.
Figure 4:
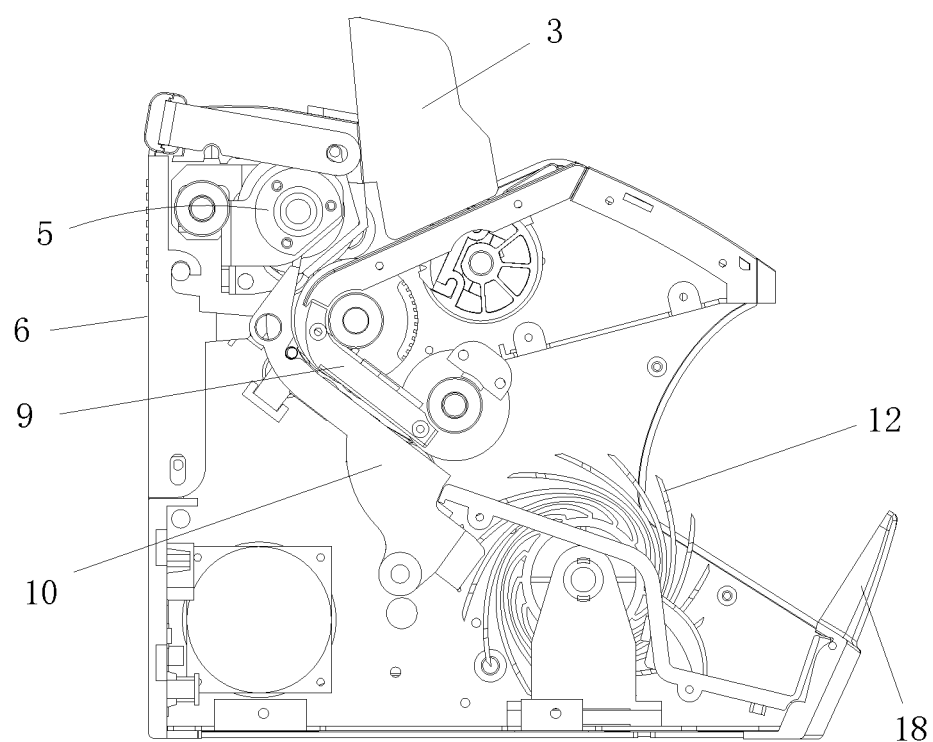
FIG. 4 is a partial assembly diagram of the cash counter of the present invention.
Figure 5:
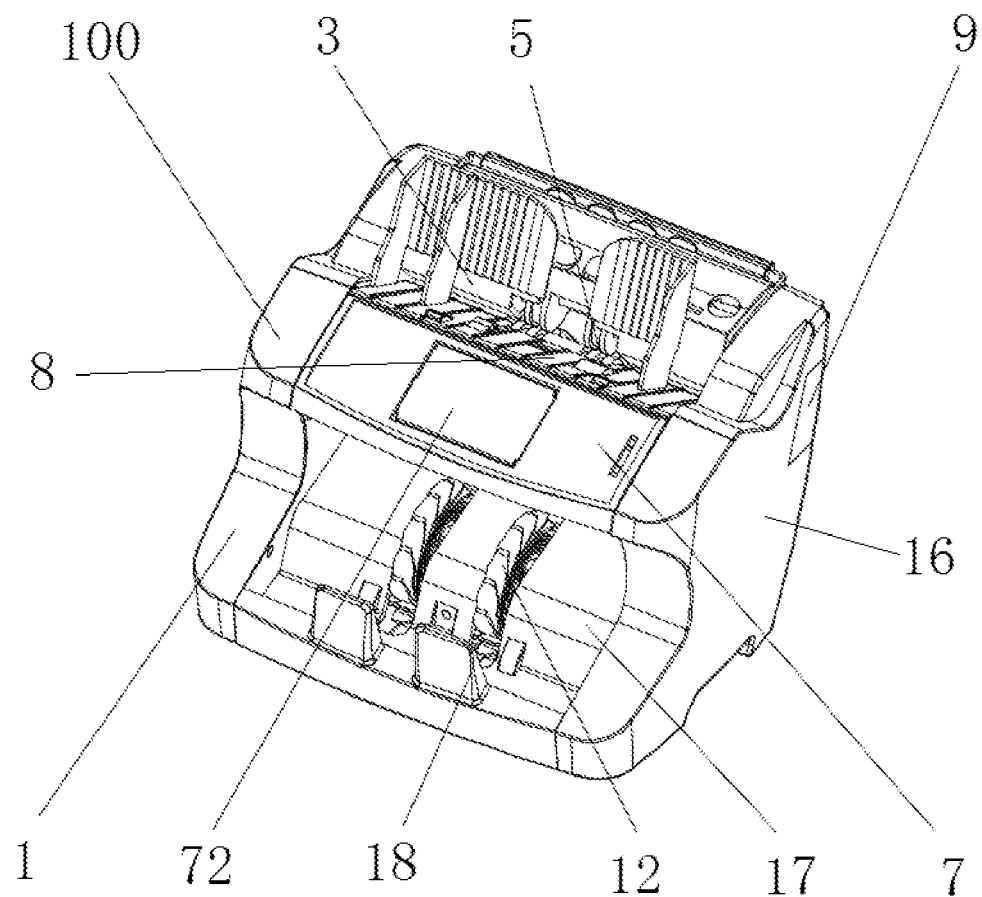
FIG. 5 is a perspective view of the cash counter of the present invention.

As shown in FIGS. 1-5, the present invention provides a novel cash counter 100 which is used for counting cashes and has an infrared light source for scanning imaging. The cash counter includes a cash counter body. The cash counter body includes a left cover 1, a left support 2, limiting pieces 3, a handle 4, a cash dispensing assembly 5, a rear cover 6, a display cover 7, a cash feeding table 8, an infrared light source emitting assembly 9, an infrared light source receiving assembly 10, a motor 11, a cash receiving assembly 12, a bottom plate 13, a right support 14, a transmission assembly 15, a right cover 16, a cash receiving rack 17, and a cash stopper 18. The cash dispensing assembly 5 includes a cash dispensing roller and a cash pressing roller.

The cash dispensing assembly 5, the infrared light source emitting assembly 9, the infrared light source receiving assembly 10, the motor 11, the cash receiving assembly 12, and the transmission assembly 15 are arranged in a space defined by the left cover 1, the right cover 16, the cash receiving rack 17, the rear cover 6, the display cover 7, and the bottom plate 13.

The cash feeding table 8 is used to place cashes to be counted, and is arranged at the upper end of the cash counter 100. A cash inlet 82 is formed at the lower end of the cash feeding table 8. Two slidably-adjustable limiting pieces 3 are arranged at the upper end of the cash inlet 82. Different sizes of cashes may be placed on the cash feeding table 8 by adjusting the limiting pieces 3, so as to initially locate a large number of cashes. The handle 4 is provided between the left cover 1 and the right cover 16, so as to assist in holding the cash counter 100 with hands. The handle 4 may be or may not be provided as needed. The cash dispensing assembly 5 is provided beside the cash inlet 82. The cash dispensing assembly 5 is configured such that each cash is rolled into a cash passing channel formed by a plurality of rollers in the transmission assembly of the cash counter 100, so as to perform the next step of identifying the cashes. In the cash passing channel, the infrared light source emitting assembly 9 emits infrared light onto each cash, and then the infrared light source receiving assembly 10 judges and determines the authenticity of this cash.

At this time, each cash (paper money) passes through the infrared light source emitting assembly and the infrared light source receiving assembly, and then passes through counterfeit identification sensors such as a large magnetic device (magnetic sensor), an edge magnetic device, a counter tube, etc. However, the infrared light source receiving assembly will identify the authenticity of each cash for the first time according to the strength of a voltage that the infrared light source emitting assembly penetrates this cash, by processing this cash by means of a logic chip of the infrared light source receiving assembly and then sending to a main control chip for fuzzy imaging. The result content after final identification in conjunction with the remaining auxiliary counterfeit identification sensors is sent to the display screen through the main control chip and displayed (displayed with symbols such as characters and letters). If this cash is identified as a genuine cash, it will enter the cash receiving assembly 12 (or called a cash receiving reel), rolls over the cash receiving assembly 12 to the cash receiving rack 17, and is blocked by the cash stopper 18 to prevent the cashes from scattering; and if this cash is identified as a counterfeit cash, when this cash reaches the cash receiving rack 17, the cash counter 100 will automatically stop and give an alarm to indicate that this cash is a counterfeit or suspicious cash. The display screen 72 (see FIG. 5) installed on the display cover 7 displays the number of the identified cashes. The motor 11 supplies power for the cash dispensing assembly 5, the cash receiving assembly 12 and the transmission assembly 15 to rotate, respectively.

The working principle of the cash counter 100 of the present invention is as follows: the limiting pieces are adjusted to a length approximately the same as the length of cashes to be counted; the cashes to be counted are put into the cash feeding table 8, and the cash counter 100 automatically starts to count the cashes; firstly, the cash dispensing assembly 5 of the cash counter 100 will feed the first cash at the bottom of the cashes, and then the cash dispensing roller and the cash pressing roller of the cash dispensing assembly 5 will roll this cash into the cash passing channel; at this time, this cash will pass through the infrared light source emitting assembly and the infrared light source receiving assembly, and then passes through the counterfeit identification sensors such as a large magnetic device, an edge magnetic device, a counter tube, etc. However, the infrared light source receiving assembly will identify the authenticity of this cash for the first time according to the strength of a voltage that the infrared light source emitting assembly penetrates this cash, by processing this cash by means of a logic chip of the infrared light source receiving assembly and sending to a main control chip for imaging. The result after final identification in conjunction with the remaining auxiliary counterfeit identification sensors is sent to the display screen 72 of the cash counter 100 through the main control chip and displayed (displayed with symbols such as characters and letters). If this cash is identified as a genuine cash, it will be conveyed out by the cash receiving assembly 12, and rolls to the cash receiving rack 17; and if this cash is identified as a counterfeit cash, when this cash reaches the cash receiving rack 17, the cash counter 100 will automatically stop and give an alarm to indicate that this cash is a counterfeit or suspicious cash.

It can be understood that the positional relationship between the infrared light source emitting assembly and the infrared light source receiving assembly is not limited to this embodiment, and the positions of the infrared light source emitting assembly and the infrared light source receiving assembly may also be exchanged.

The working principle of the existing cash counter is as follows: the authenticity is identified by means of an infrared image by using an infrared light source of a CIS image sensor, as well as infrared and reflective collection technologies, by performing full-frame scanning and collection of cashes, reading the infrared image and comparing the same with an infrared image of a genuine cash. However, the present invention adopts an infrared induction technology to scan and count cashes, which can count one thousand cashes per minute and realize infrared imaging. The infrared light source emitting assembly is responsible for sensing light.

The infrared light source receiving assembly is responsible for scanning sensing, and making adjustments according to different types of cashes. During cash counting, cashes are placed at the cash inlet 82 of the cash receiving table 8. After the cash counter 100 is powered on, the cashes are automatically rolled into the inside of the cash counter 100 for a cash counting operation. An infrared fuzzy imaging cash-counting operation is performed by the infrared light source receiving assembly, with a faster cash counting speed and higher accuracy, and displayed on the display screen 72 of the display cover 7, such that the work efficiency is improved. After the counting and authenticity identifying of the cashes are completed, the cashes are conveyed out through the cash receiving assembly 12. The cashes are received and blocked by the cash receiving rack 17 and a cash stopper 18 to prevent the cashes from falling, which is simple and practical. Compared with the prior art, the main difference between the structure of the present invention and the structure of the prior art lies in that the infrared light source emitting assembly and the infrared light source receiving assembly are provided. Other structures of the present invention are similar to those of the prior art.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the present invention.

What is claimed is:

1. A cash counter with an infrared light source for scanning imaging comprising:
    a cash counter body, the cash counter body comprising a cash feeding table, a cash dispensing assembly, an infrared light source emitting assembly, an infrared light source receiving assembly, a motor, a transmission assembly, a display screen for displaying the number of cashes, a cash receiving assembly and a cash receiving rack, wherein
    the cash feeding table is provided at an upper end of the cash counter body, and a cash inlet is defined at a lower end of the cash feeding table; the cash dispensing assembly is arranged beside the cash inlet; the cash dispensing assembly is configured such that each cash is rolled into the cash counter body and enters a cash passing channel formed by a plurality of rollers in the transmission assembly;
    the infrared light source emitting assembly and the infrared light source receiving assembly are provided to face each other; a channel between the infrared light source emitting assembly and the infrared light source receiving assembly constitutes a part of the cash passing channel; the infrared light source emitting assembly emits infrared light onto each cash; the infrared light source receiving assembly is configured to identify the authenticity of each cash according to the strength of a voltage that the infrared light source emitting assembly penetrates each cash, by processing each cash by means of a logic chip of the infrared light source receiving assembly and then sending to a main control chip for fuzzy imaging; the infrared light source receiving assembly makes adjustments according to different types of cashes; the number of the identified cashes is displayed on the display screen;
    the cash receiving assembly receives the identified cashes and transfers the identified cashes to the cash receiving rack; and
    the motor supplies power for the cash dispensing assembly, the cash receiving assembly and the transmission assembly to rotate, respectively.

2. The cash counter according to claim 1, wherein the cash counter body further comprises a plurality of counterfeit identification sensors that assists in identifying each cash.

3. The cash counter according to claim 1, wherein two slidably-adjustable limiting pieces are provided at an upper end of the cash inlet, and different sizes of cashes are placed on the cash feeding table by adjusting the limiting pieces.

4. The cash counter according to claim 1, wherein a cash stopper for blocking cashes and preventing the cashes from scattering is provided outside the cash receiving rack.

5. The cash counter according to claim 1, wherein the cash dispensing assembly comprises a cash dispensing roller and a cash pressing roller.

6. The cash counter according to claim 1, wherein the cash counter body further comprises a left cover and a right cover, and a handle which assists in carrying the cash counter body with hands is arranged between the left cover and the right cover.

7. The cash counter according to claim 1, wherein a display cover is further arranged at an upper part of the cash counter body, and the display screen is provided on the display cover.

* * * * *